Nov. 20, 1934.  G. MÜLLER  1,981,659
STAVE OR BOTTOM FOR BARRELS AND VATS, ETC
Filed Sept. 19, 1933
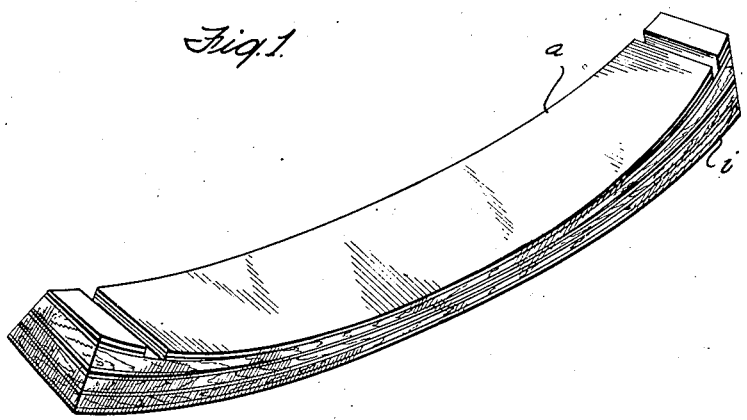
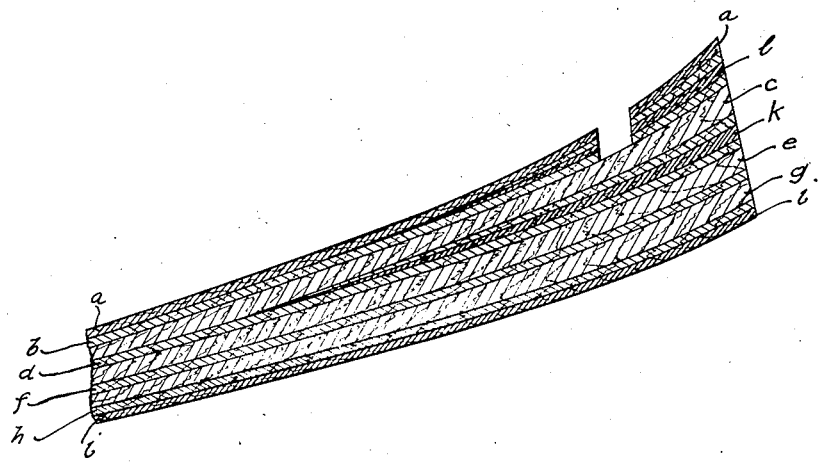
INVENTOR
GEORG MÜLLER
BY
ATTORNEY Patented Nov. 20, 1934

1,981,659

UNITED STATES PATENT OFFICE 1,981,659

STAVE OR BOTTOM FOR BARRELS AND VATS, ETC.

Georg Müller, Leipzig, Germany

Application September 19, 1933, Serial No. 690,046
In Germany September 7, 1933

3 Claims. (Cl. 217—88)

My invention relates to the manufacture of barrels, and more particularly, the manufacture of staves, such as described in my co-pending application, Serial No. 680,029, filed on July 12, 1933, in which I have described and shown a barrel stave composed of a plurality of superposed layers of wood joined together under pressure in a moulding press so as to impart to the staves the required curvature.

The stave, according to the present invention, is similarly made of a plurality of layers of wood, but the ends of the stave are thickened or strengthened by the insertion between certain of the full length layers of shorter wedge-shaped wooden layers, joined to the other layers by a binding agent and compressed therewith in the moulding press. In this manner, the ends of the staves, where the grooves are cut to receive the barrel heads or bottoms, are effectively strengthened.

My invention is shown, by way of illustration, on the annexed drawing, on which

Fig. 1 is a perspective view of a stave produced in accordance with this invention, while Fig. 2 is an edge-view of an end portion of the stave, drawn to a larger scale.

The stave shown on the drawing consists of nine layers of wood as indicated at $a$, $b$, $c$, $d$, $e$, $f$, $g$, $h$ and $i$, all of the full length of the stave. The layers $a$ and $i$ are, for instance, of oak wood, the layers $b$, $d$, $f$ and $h$ of elm-wood, and the layers $c$, $e$ and $g$ of beech-wood.

In barrels being used for red wine, the innermost layer $a$ is preferably of chestnut wood. The wood for the outside layer $i$ is selected with reference to the stresses to which the barrel is subjected, as well as with reference to the desired appearance.

The various layers are joined together under pressure with the aid of a binding agent, preferably a binding agent insoluble in liquids.

As shown in Fig. 2, for the purpose of strengthening the ends of the staves, two shorter layers of a suitable wood are inserted, for example, between the layers $c$ and $d$ and between the layers $a$ and $b$, as indicated at $k$ and $l$ respectively. These intermediate layers, which may vary in length, are wedge-shaped and serve to increase the cross-section of the stave at its ends where the grooves are cut to receive the heads or bottoms of the barrel. The intermediate layers $k$ and $l$ are joined to the full-length layers also by a suitable binder, the whole structure being compressed in a suitable moulding press.

What I claim and desire to secure by Letters Patent is:

1. A stave for barrels and the like composed of a plurality of superposed united layers of wood extending the full length of the stave, and layers of wood of shorter length between adjacent full-length layers at the ends of the stave, to provide stave end portions of greater thickness than the medial portion thereof.

2. A stave for barrels and the like, composed of a plurality of superposed united layers of wood extending the full length of the stave, and wedge-shaped layers of wood of shorter length between adjacent full-length layers at the ends of the stave, to provide stave end portions of greater thickness than the medial portion thereof.

3. A stave as specified in claim 2, comprising a binding agent provided between the various layers.

GEORG MÜLLER.